United States Patent

Nagasawa et al.

(10) Patent No.: US 9,551,917 B2
(45) Date of Patent: Jan. 24, 2017

(54) LIGHT SOURCE UNIT AND PROJECTION DISPLAY SYSTEM USING SAME

(71) Applicant: Hitachi Consumer Electronics Co., Ltd., Yokohama, Totsuka-ku (JP)

(72) Inventors: Mitsuru Nagasawa, Tokyo (JP); Satoshi Ouchi, Tokyo (JP); Kunikazu Ohnishi, Tokyo (JP); Tomoto Kawamura, Yokohama (JP)

(73) Assignee: HITACHI CONSUMER ELECTRONICS CO., LTD., Yokohama (JP)

( * ) Notice: Subject to any disclaimer, the term of this patent is extended or adjusted under 35 U.S.C. 154(b) by 307 days.

(21) Appl. No.: 14/048,067

(22) Filed: Oct. 8, 2013

(65) Prior Publication Data

US 2014/0098349 A1   Apr. 10, 2014

(30) Foreign Application Priority Data

Oct. 9, 2012   (JP) ................................. 2012-223800

(51) Int. Cl.
  *G03B 21/14*   (2006.01)
  *G03B 21/20*   (2006.01)
  *G03B 33/12*   (2006.01)

(52) U.S. Cl.
  CPC ........... *G03B 21/142* (2013.01); *G03B 21/208* (2013.01); *G03B 21/2033* (2013.01); *G03B 33/12* (2013.01)

(58) Field of Classification Search
  CPC . G03B 21/142; G03B 21/2033; G03B 21/208; G03B 21/14; G03B 21/00; G03B 33/12; G02B 27/10

USPC ............................................................ 353/31
See application file for complete search history.

(56) References Cited

U.S. PATENT DOCUMENTS

| | | | |
|---|---|---|---|
| 8,238,029 B2 | 8/2012 | Hudman | |
| 2004/0017518 A1* | 1/2004 | Stern et al. | .................. 348/744 |
| 2004/0246442 A1* | 12/2004 | Lee | ...................... H04N 9/3117 353/30 |
| 2006/0044515 A1* | 3/2006 | Suzuki | ................. H04N 9/3105 353/20 |
| 2010/0033685 A1* | 2/2010 | Seo | .......................... G02B 5/04 353/31 |
| 2010/0165300 A1* | 7/2010 | Shimaoka et al. | .............. 353/33 |
| 2010/0231862 A1* | 9/2010 | Itoh | .................... G02B 27/0994 353/31 |

(Continued)

*Primary Examiner* — Bao-Luan Le
*Assistant Examiner* — Christopher Lamb, II
(74) *Attorney, Agent, or Firm* — Baker Botts L.L.P.

(57) ABSTRACT

The projection display system has a light source unit where a first light source and a second light source respectively emitting a first and second wavelength or wavelength range of light are juxtapositionally arranged; a third light source emitting a third wavelength or wavelength range of light; an optical combiner device for combining the three wavelengths or wavelength ranges of light from the light sources; an optical device for averaging distributions of the wavelengths or wavelength ranges of light; an image display device for receiving the light transmitted through the optical device and forming image light responsive to a video signal; and a projector lens for projecting the image light onto a screen. At least two of the optical axes of the first, second, and third wavelengths or wavelength ranges of light which are incident on the optical device are not coincident with each other.

2 Claims, 14 Drawing Sheets

(56) References Cited

U.S. PATENT DOCUMENTS

| | | | |
|---|---|---|---|
| 2010/0245775 A1* | 9/2010 | Rubinshtein | G02B 13/005 353/31 |
| 2011/0199581 A1* | 8/2011 | Jhang | H04N 9/3152 353/31 |
| 2012/0044462 A1* | 2/2012 | Kaji | G03B 21/2033 353/31 |
| 2012/0249971 A1* | 10/2012 | Chen et al. | 353/31 |
| 2013/0063701 A1* | 3/2013 | Ouderkirk et al. | 353/20 |

* cited by examiner

LIGHT SOURCE UNIT AND PROJECTION DISPLAY SYSTEM USING SAME

INCORPORATION BY REFERENCE

The present application claims priority from Japanese application JP-2012-223800 filed on Oct. 9, 2012, the contents of which are hereby incorporated by reference into this application.

BACKGROUND OF THE INVENTION

The present invention relates to a light source unit and projection display system for combining certain wavelengths of light from LED light sources or laser light sources and projecting the combined wavelengths of light onto a screen by the use of an image display device.

In recent years, single-color LED light sources of red, green, and blue colors producing higher output and semiconductor lasers of red, green, and blue colors producing higher output have been fabricated. Consequently, small-sized projectors using these light sources have enjoyed wider acceptance in the market.

Known image display devices used in small-sized projectors include LCOS (liquid crystal on silicon) being reflective liquid crystal displays, DMD (digital micromirror device), and MEMS (Microelectromechanical Systems) mirrors scanned in two dimensions.

In these small-sized projectors, output wavelengths of light from monochrome LEDs of three colors or from semiconductor lasers are combined into one and visualized by an image display device such as LCOS or DMD. In MEMS mirror technology, the output colors of light from monochrome LEDs of three colors or semiconductor lasers are combined in one optical path, and light is scanned for each color in turn to display a visible image.

U.S. Pat. No. 8,238,029 (patent literature 1) discloses a technique for combining beams of light emitted from monochrome LEDs of three colors or from semiconductor lasers by a dichroic mirror consisting of surfaces which are different in wavelength selectivity.

Where colors of light from monochrome light sources of three colors are shone on a single image display device, it is necessary to provide a means for combining light sources of red, green, and blue into one common optical system. Where separate optical elements are used to combine three colors, the number of components is increased and the whole light source unit is increased in size. This is disadvantageous for miniaturization and cost reduction.

According to the technique disclosed in patent literature 1, three colors of light can be combined using one dichroic mirror but combination of beams of light projected onto an MEMS mirror is described. However, use of image display devices using two-dimensional light sources such as LCOS or DMD is not taken into account.

SUMMARY OF THE INVENTION

It is an object of the present invention to provide a light source unit which has two-dimensional miniaturizable light sources using solid-state light sources such as LEDs or semiconductor lasers and which can provide a uniform illumination distribution. It is another object of the invention to provide a projection display system using this light source unit.

The first-mentioned object is achieved in accordance with the teachings of the present invention by a light source unit for use with or in a projection display system that projects an image onto a plane. The light source unit has: a first solid-state light source emitting two-dimensional light fluxes of a first color to be projected; a second solid-state light source emitting two-dimensional light fluxes of a second color to be projected; a third solid-state light source emitting two-dimensional light fluxes of a third color to be projected; a wedge-shaped dichroic mirror having a first dichroic surface and a second dichroic surface which are located opposite to each other in a non-parallel relationship to each other, the first dichroic surface reflecting the light fluxes from the first solid-state light source, the second dichroic surface reflecting the light fluxes from the second solid-state light source, the light fluxes from the third solid-state light source being reflected off and transmitted through the first and second dichroic surfaces; and a lens array for smoothing an illuminance distribution of light fluxes incident from the wedge-shaped dichroic mirror. The light fluxes from the third solid-state light source define an optical axis that is bent by the wedge-shaped dichroic mirror so as to be coincident with an optical axis of the lens array and incident on the lens array. The light fluxes from the first solid-state light source and the light fluxes from the second solid-state light source are reflected symmetrically about the optical axis of the lens array by the wedge-shaped dichroic mirror and enter the lens array.

In one feature of this light source unit, the first solid-state light source and the second solid-state light source are disposed close to each other. There is further provided a first spherical or nonspherical collimator lens for converting the light fluxes emerging from the first and second solid-state light sources into substantially collimated light and directing this collimated light to the wedge-shaped dichroic mirror. Also, there is further provided a second spherical or nonspherical collimator lens for converting the light fluxes emerging from the third solid-state light source into substantially collimated light and directing this collimated light to the wedge-shaped dichroic mirror. The first and second solid-state light sources are offset a given amount with respect to the optical axis of the first collimator lens. The optical axis of the substantially collimated light from the first solid-state light source and the optical axis of the substantially collimated light fluxes from the second solid-state light source are different in direction from the optical axis of the first collimator lens. The third solid-state light source is disposed at a position on the optical axis of the second collimator lens. The optical axis of the substantially collimated light fluxes from the third solid-state light source is coincident in direction with the optical axis of the second collimator lens.

According to the present invention, a light source unit can be offered which has a simple structure but which can achieve both miniaturization of the light source unit and uniformity of illuminance on a screen. Also, a projection display system equipped with this light source unit can be offered.

Other objects, feature and advantages of this invention will become apparent from the following description of the embodiments taken in conjunction with the accompanying drawings.

DESCRIPTION OF THE EMBODIMENTS

Figure 1:
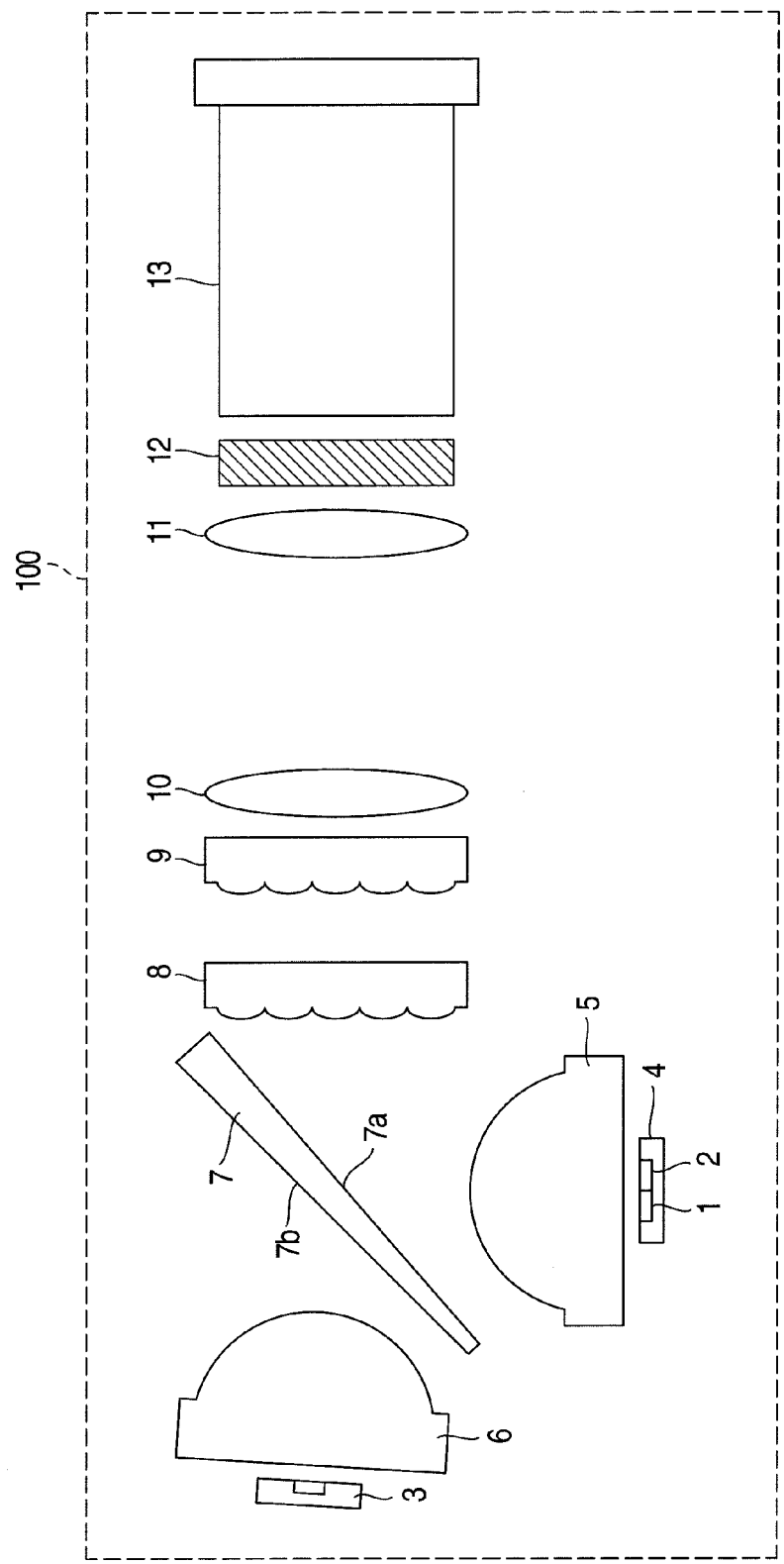
FIG. 1 is a schematic representation of a light source unit according to Embodiment 1 of the present invention.

The preferred embodiments of the light source unit according to the present invention and projection display system equipped with the light source unit are hereinafter described with reference to the drawings. It is to be understood that the scope of the invention is not restricted by the following description. Throughout all the figures, constituent elements which are identical in operation may be indicated by the same reference numerals.

Embodiment 1

FIG. 1 shows one example of an optical engine 100 of a projection display system according to the present invention. The optical engine 100 has LED light sources 1, 2, and 3 each emitting light fluxes of a given wavelength or wavelength range.

In the present embodiment, it is assumed that the LED light source 1 emits red light fluxes having a center wavelength of about 615 nm, the LED light source 2 emits blue light fluxes having a center wavelength of about 460 nm, and the LED light source 3 emits green light fluxes having a center wavelength of about 525 nm. The wavelengths are not limited to the above-described values. Furthermore, each of these three colors of light may have a given wavelength range. In addition, the light sources may also be solid-state light-emitting devices other than LEDs such as laser diodes emitting visible light.

Each LED light source of the present embodiment emits light fluxes which show a symmetrical distribution of light intensity and light fluxes emitted from the center of the light source are strongest. It is assumed in the present embodiment that the optical axis of the light fluxes is taken as this center at which the light intensity is strongest.

The LED light sources 1 and 2 of the embodiment are juxtapositionally mounted in a light source unit 4, thus forming a multichip module. Since the light sources of the LED devices are juxtaposed in a close relationship to each other, a small-sized light source unit can be accomplished.

In the present embodiment, the red LED light source 1 and the blue LED light source 2 together constitute the multichip module. On the other hand, the green LED light source 3 is a module of a single color. In this embodiment, in view of efficiency of emission of green light, the LED light source 3 emits a single color of light. The present invention is not restricted to this configuration.

Red light fluxes emitted from the LED light source 1 and blue light fluxes emitted from the LED light source 2 are converted into substantially collimated light by a capture lens 5. Green light fluxes emitted from the LED light source 3 are converted into substantially collimated light by another capture lens 6. Each of the capture lenses 5 and 6 is an isotropic spherical or nonspherical lens made of glass or plastic.

The present embodiment is characterized in that the light fluxes from the two light sources, i.e., LED light sources 1 and 2, can be substantially collimated by the common capture lens 5. This contributes a decrease in the number of components. Also, the optical engine 100 can be reduced in size.

As described previously, the light fluxes from the LED light sources 1 and 2 are substantially collimated by the single capture lens 5. It is to be noted that the optical axes of the light fluxes from these two light sources deviate from the optical axis of the capture lens 5. More specifically, the optical axes of the light fluxes from the LED light sources 1 and 2 are shifted with respect to the optical axis of the lens 5 in a parallel relation to each other.

Each one of the capture lenses 5 and 6 substantially collimates light fluxes. In order to obtain desired substantially collimated light, two or more capture lenses can be disposed in the direction of travel of light fluxes. In this case using two or more lenses, smaller and simpler lenses of smaller refractive index can be used than where a single capture lens is used.

A wedge-shaped dichroic mirror 7 is an optical combiner device that combines the red, blue, and green light fluxes passed through the capture lenses 5 and 6. The dichroic mirror 7 has a mirror surface 7a located closer to the capture lens 5. The mirror surface 7a is a wavelength-selective mirror surface that has a function of reflecting the red light fluxes and transmitting the blue and green light fluxes. Furthermore, the dichroic mirror 7 has a mirror surface 7b located closer to the capture lens 6. The mirror surface 7b is a wavelength-selective mirror surface that has a function of reflecting the blue light fluxes and transmitting the red and green light fluxes. Because of these functions of the dichroic mirror, the wedge-shaped dichroic mirror 7 combines the light fluxes of the three colors from the LED light sources. The relation between the optical axis of the wedge-shaped dichroic mirror 7 and the optical axes of the LED light sources will be described in detail later.

The output light fluxes from the dichroic mirror 7 enter two lens arrays, i.e., lens arrays 8 and 9. The lens arrays 8 and 9 together constitute an integrator optical system. The lens arrays 8 and 9 are made of the same number of lens cells. The lens array 8 divides the light fluxes showing a distribution of light intensity prior to incidence by the number of lens cells and collects them on the lens array 9. Since the LED light sources and the lens array 9 are designed to be in a conjugate relation, images of virtual light sources equal in number to the lens cells are formed on the lens array 9. In FIG. 1, one side of each lens array is shown to be made up of five lens cells. Obviously, the number of lens cells is not restricted to five.

The light fluxes passed through the lens array 9 propagate through relay lenses 10 and 11 and impinge on an image display device 12. The relay lens 10 has a function of superimposing the optical images from the lens cells of the lens array 9. The relay lens 11 has a function of converting the superimposed light fluxes into substantially collimated light and making the collimated light hit the display device 12.

In this way, the illuminating optical system beginning with the lens array 8 and ending with the relay lens 11 can form an image of uniform illumination on the image display device 12. In FIG. 1, there are two relay lenses. As long as a desired image can be obtained on the image display device 12, any desired number of relay lenses may be used.

The image formed on the image display device 12 is projected onto a screen (not shown) via a projector lens 13, whereby a magnified image is obtained on the screen. As described so far, the light source unit for the image display device displays a desired image on the screen by the use of the three monochrome light sources, one image display device, and optical parts permitting propagation of light.

The relation among the optical axis of the wedge-shaped dichroic mirror 7 and the optical axes of the light fluxes from the LED light sources is next described in detail with reference to FIG. 2. In this FIG. 2, in the optical system beginning with the LED light source 1 and ending with the lens array 8 shown in FIG. 1, the relation among the optical axis 21 of the red light fluxes emitted from the LED light source 1, the optical axis 22 of the blue light fluxes emitted from the LED light source 2, and the optical axis 23 of the green light fluxes emitted from the LED light source 3 is shown. The optical axis 21 of the red light fluxes from the light source 1 is indicated by a solid line. The optical axis 22 of the blue light fluxes from the light source 2 is indicated by a dotted line. The optical axis 23 of the green light fluxes from the light source 3 is indicated by a dot-and-dash line.

As described previously, in the present embodiment, to miniaturize the light source unit for use with a projection display system, the LED light sources 1 and 2 are integrated into the light source unit 4. The light fluxes from the LED light sources 1 and 2 are substantially collimated by the single capture lens 5. Because of this configuration, the light axes of the red and blue light fluxes from the light sources enter the optical combiner device (dichroic mirror) while are not parallel to each other.

Where a dichroic mirror in the form of a plane parallel plate is used as the optical combiner device, if the optical system is so set that the red light fluxes travel substantially parallel to the optical axis of the lens array 8 and enter the lens array 8, then the blue light fluxes enter the lens array 8 at a large tilt angle to the optical axis of the lens array 8. As a result, there is a large loss in the efficiency at which light is propagated from the lens array 8 to the lens array 9. The illuminance distribution of the image on the screen will deteriorate.

Where two dichroic mirrors, each in the form of a plane parallel plate, for red light and blue light, respectively, are disposed as the optical combiner device, the angles of the mirror surfaces can be set for the red light fluxes and blue light fluxes independently and so all the light fluxes can be made to enter the lens array 8 while their optical axes are substantially parallel to the optical axis of the lens array 8. However, various new problems are incurred. That is, the space for accommodating the parts is increased because the two dichroic mirrors are used. This is disadvantageous to miniaturization. Since the number of dichroic mirrors is increased to two, mounting error produces greater effects. The efficiency of transmission of the green light fluxes passing through the two dichroic mirrors, each in the form of a plane parallel plate, more deteriorates.

Accordingly, in the present embodiment, the wedge-shaped dichroic mirror 7 having mirror surfaces which are opposite to each other in a non-parallel relation is arranged. In this configuration, the wedge-shaped contour is so designed that the mirror surface 7a reflects only the red light fluxes and that the mirror surface 7b reflects only the blue light fluxes. As a result, as shown in FIG. 2, the light fluxes emerging from the dichroic mirror can be substantially collimated while all the optical axes of the light fluxes emerging from the dichroic mirror are substantially parallel to the optical axis of the lens array 8. Since there is only one optical combiner device, mounting error produces fewer problems. Also, deterioration in the transmission efficiency can be lessened. Furthermore, the space for arrangement can be reduced.

Figure 2:
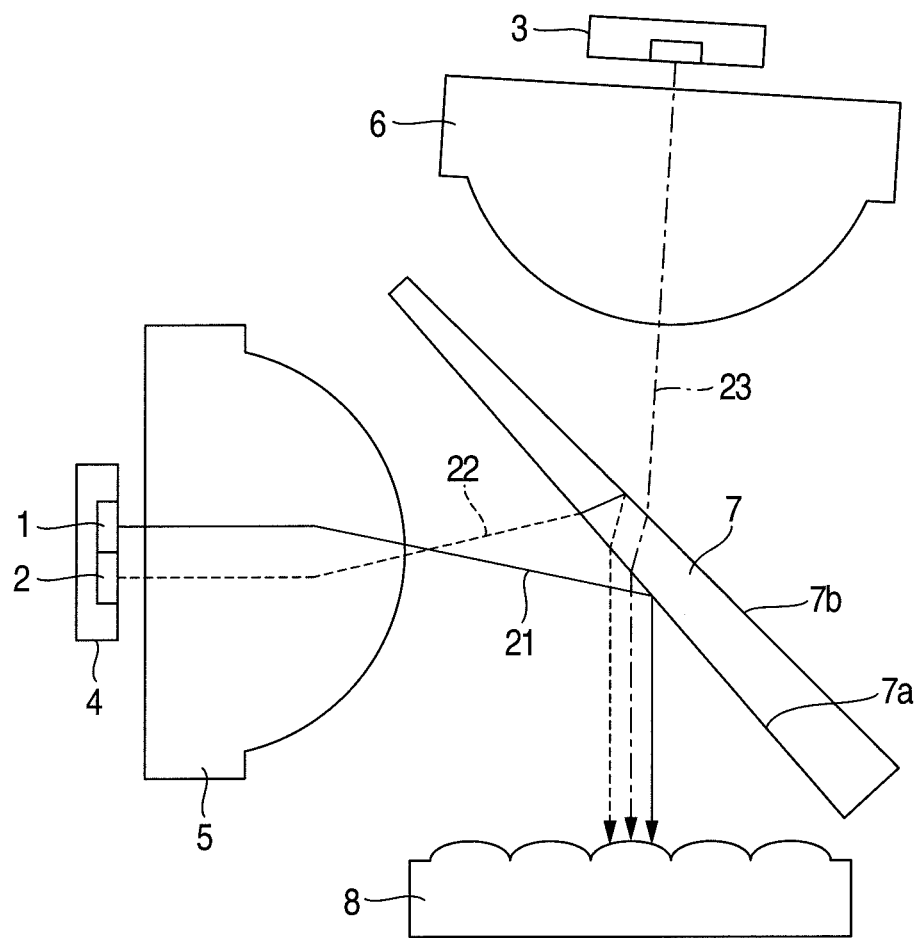
FIG. 2 is a schematic representation showing one relationship between the optical axes of light fluxes according to the invention, the light fluxes being emitted from light sources.

The LED light source 3 and the capture lens 6 are so arranged that the optical axis 23 of the green light fluxes from the LED light source 3 is coincident with the optical axis of the capture lens 6 as shown in FIG. 2. The green light fluxes enter the wedge-shaped dichroic mirror 7, are reflected at the mirror surfaces 7a and 7b, and leave for the lens array 8.

At this time, the optical axis 23 of the green light fluxes from the light source is brought into coincidence with the optical axis of the lens array 8. The red light fluxes and the blue light fluxes enter the lens array 8 while their optical axes 21 and 22 are substantially parallel to each other and equally spaced from the optical axis 23 of the green light fluxes from the light source.

As described previously, in the configuration of this embodiment, the optical axis 21 of the red light fluxes from the light source and the optical axis 22 of the blue light fluxes from the light source are offset a given amount with respect to the optical axis of the capture lens. Therefore, the light intensity of the light fluxes passed through the capture lens 5 shows a nonsymmetric distribution. Consequently, the light intensity of the red light fluxes entering the lens array 8 after being reflected by the mirror surface 7a of the wedge-shaped dichroic mirror 7 exhibits a nonsymmetric distribution. Similarly, the light intensity of the blue light fluxes entering the lens array 8 after being reflected by the mirror surface 7b of the dichroic mirror 7 has a nonsymmetric distribution. The green light fluxes are coincident in optical axis with the capture lens 6 and so the light intensity of the light fluxes which enter the lens array 8 after being transmitted through the mirror surfaces 7a and 7b of the dichroic mirror 7 shows a symmetric distribution.

The red and blue light fluxes having nonsymmetric distributions of light intensity are made to enter the lens array 8 while their optical axes are offset a given amount with respect to the optical axis of the lens array 8. Since the optical axes are offset, the distributions of light intensity in the lens cells of the lens array are nonsymmetric. However, these distributions are superimposed on each other on the surface of the image display device 12, resulting in improved symmetry of illuminance.

Figure 3:
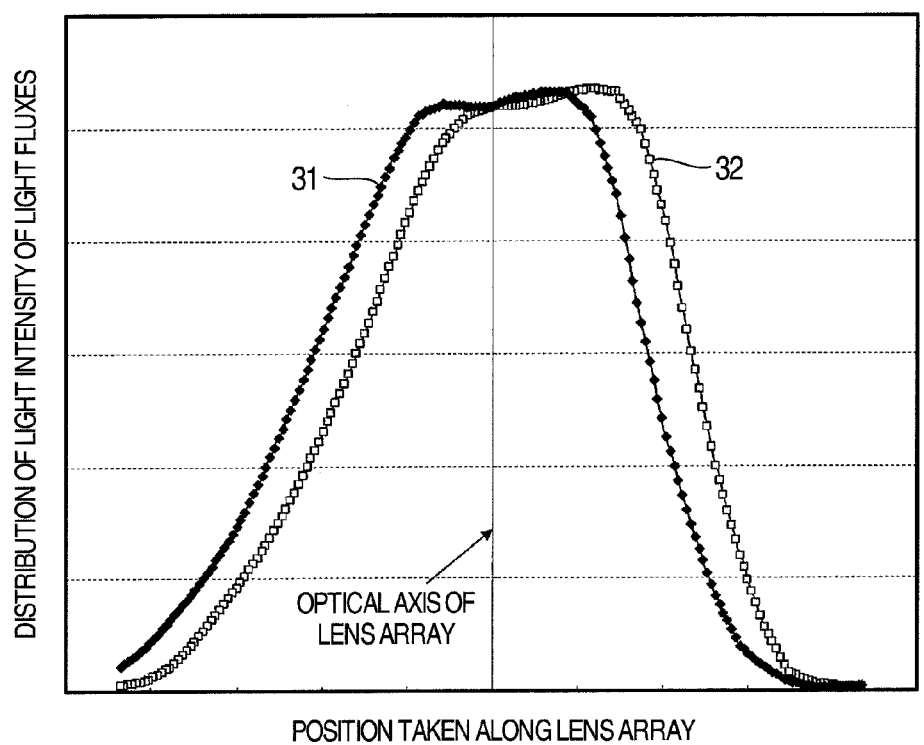
FIG. 3 is a graph showing a distribution of light intensity of light fluxes on a lens array according to the invention.

FIG. 3 shows one example of light intensity distribution of red light fluxes when they are incident on the lens array 8. The horizontal axis indicates positions taken along the lens array. The vertical axis indicates a distribution of the light intensity of light fluxes. The solid line extending from the center of the horizontal axis indicates the optical axis of the lens array. A waveform 31 shows a distribution of light intensity obtained when the optical axis of light fluxes emanating from a light source has been brought into coincidence with the optical axis of the lens array. A waveform 32 shows a distribution of light intensity obtained when one optical axis such as the optical axis 21 has been offset a given amount with respect to the optical axis of the lens array as shown in FIG. 2.

Figure 4:
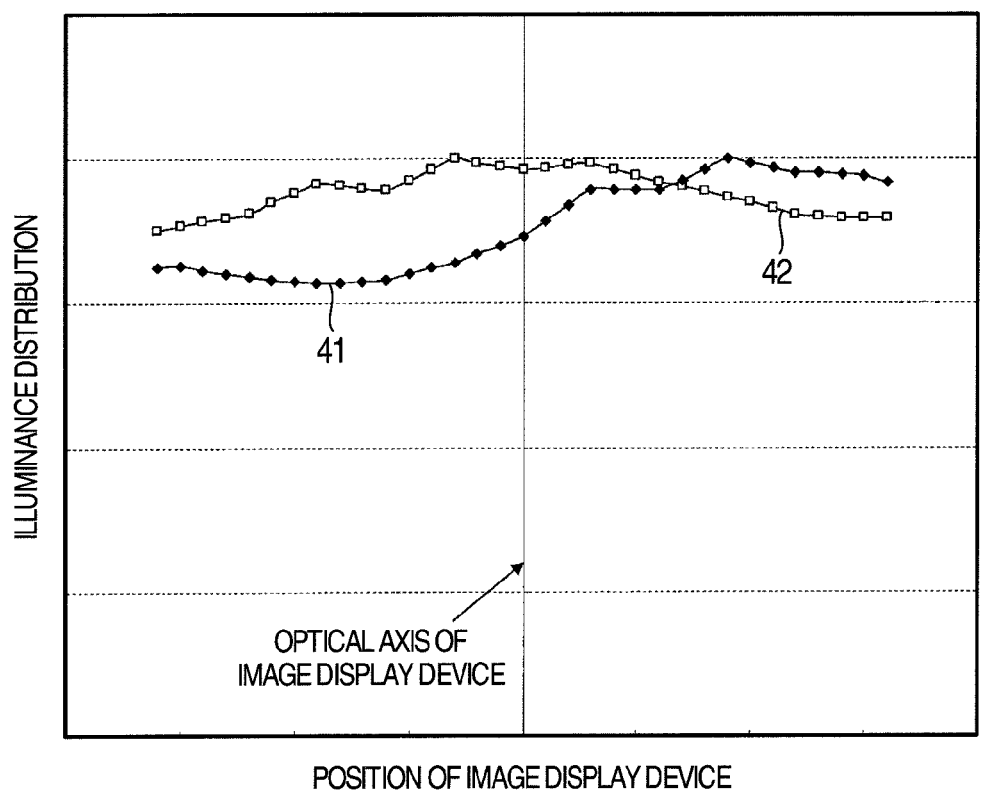
FIG. 4 is a graph showing an illuminance distribution on an image display device according to the invention.

FIG. 4 shows illuminance distributions on the image display device 12 calculated from the light intensity distributions of FIG. 3. The horizontal axis indicates positions taken along the image display device 12. The vertical axis indicates illuminance distributions on the image display device. The solid line extending from the center of the horizontal axis indicates the optical axis of the image display device. A waveform 41 shows an illuminance distribution obtained from the light intensity distribution indicated by the waveform 31 of FIG. 3. A waveform 42 shows an illuminance distribution obtained from the light intensity distribution indicated by the waveform 32 of FIG. 3.

As can be seen from the graphs of FIGS. 3 and 4, if the optical axis of light fluxes from a light source is brought into coincidence with the optical axis of the lens array as indicated by the waveform 31, a nonsymmetric illuminance distribution occurs as indicated by the waveform 41. However, a symmetric illuminance distribution as indicated by the waveform 42 can be obtained by offsetting the optical axis of the light fluxes a given amount with respect to the optical axis of the lens array as indicated by the waveform 32. The peak of the nonsymmetric waveform of the blue light fluxes and the peak of the nonsymmetric waveform of the red light fluxes are on the opposite sides of the optical axis of the lens array. Therefore, the illuminance distribution can be improved by offsetting the optical axis of the blue light fluxes a given amount in the direction away from the red light fluxes as indicated by 22 in FIG. 2.

Figure 5:
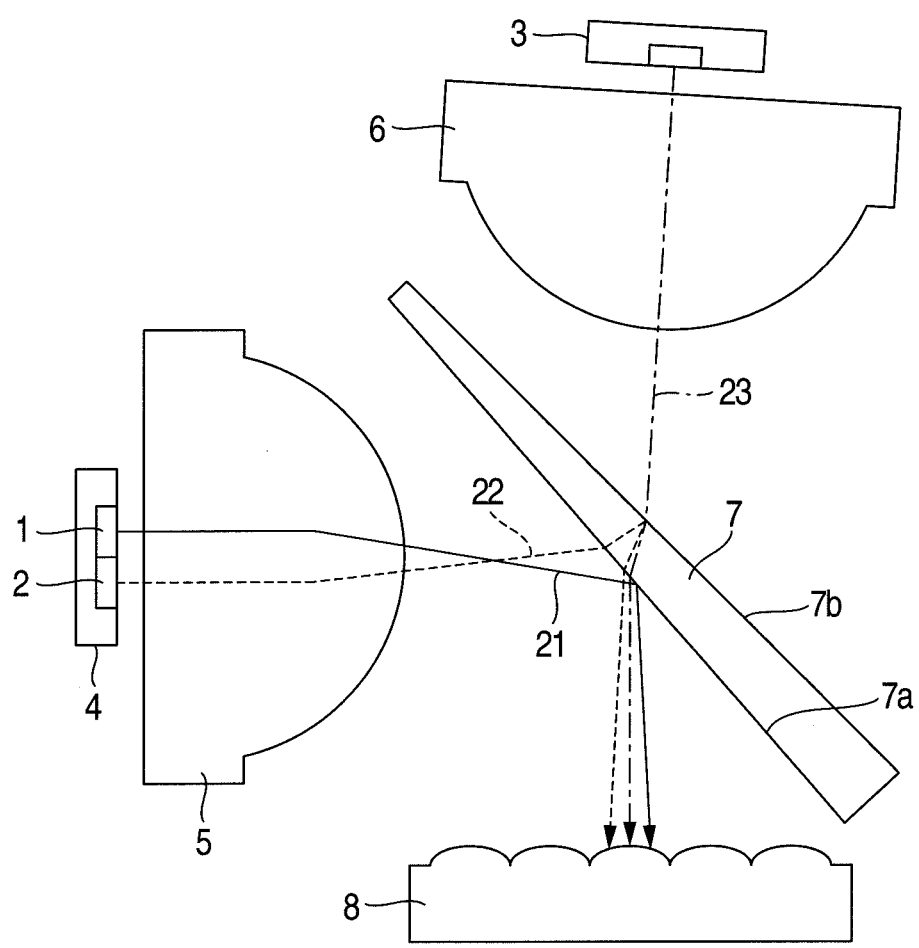
FIG. 5 is a schematic representation showing another relationship between the optical axes of light fluxes according to the invention, the light fluxes being emitted from light sources.

FIG. 5 shows another relation among the optical axes 21, 22, and 23 of the light fluxes of the three colors. The green light fluxes having the optical axis 23 are collimated such that it substantially agrees with the optical axis of the lens array 8 in the same way as in FIG. 2. However, the red light fluxes having the optical axis 21 are collimated so as to be tilted at a given angle to the optical axis of the lens array 8. The blue light fluxes having the optical axis 22 are also so collimated that the optical axis 22 is tilted at a given angle to the optical axis of the lens array 8. In this way, not all the optical axes need be converted into a parallel relation to the optical axis of the lens array 8. Rather, they may be tilted at a given angle to the optical axis of the lens array. This mitigates the restrictions on the angles of the mirror surfaces 7a and 7b of the wedge-shaped dichroic mirror 7. Thus, it is easy to fabricate the dichroic mirror 7. The optical parts can be fabricated at lower costs.

Figure 6:
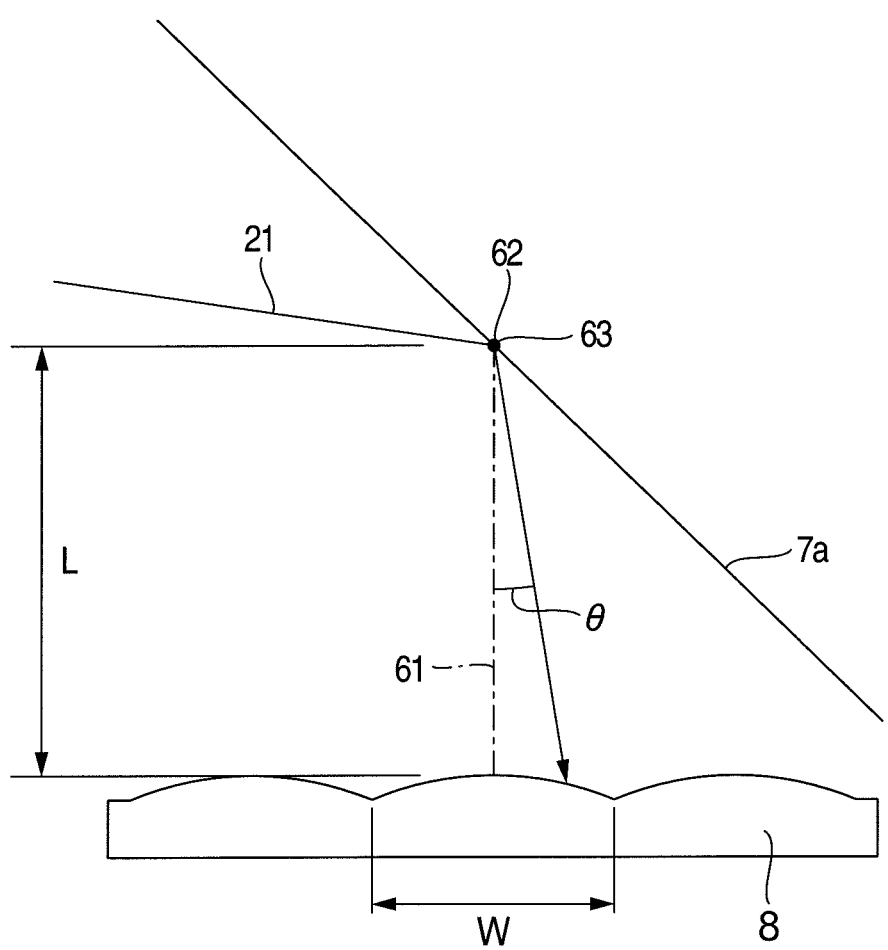
FIG. 6 is a ray diagram showing one relationship among the optical axes of light fluxes and the optical of a lens array in accordance with the invention.

FIG. 6 is a ray diagram showing details of the relation among the optical axes of the light fluxes from the light sources and the optical axis of the lens array shown in FIG. 5. As a typical example, the relation between the optical axis 21 of the red light fluxes from the light source indicated by the solid line and the optical axis 61 of the lens array 8 indicated by the dot-and-dash line is described. In FIG. 6, it is assumed that a point of reflection 62 of the optical axis 21 of the red light fluxes at the mirror surface 7a is coincident with the intersection 63 of the optical axis 61 of the lens array 8 and the mirror surface 7a.

Referring still to FIG. 6, let θ be the angle made between the optical axis 21 of the red light fluxes reflected at the mirror surface 7a and the optical axis 61 of the lens array 8. Let L be the length of the vertical line extending from the intersection 63 of the optical axis 61 of the lens array 8 and the mirror surface 7a to the lens array 8. Let W be the length of one side of each lens cell of the lens array.

Under this geometric condition, the following relation is satisfied:

$$\tan \theta < (W/2)/L \qquad (1)$$

Eq. (1) shows that the optical axis of light fluxes from a light source hits the lens cell at the center of the lens array at a given angle.

Even where light fluxes have a nonsymmetric distribution of light intensity, the illuminance distribution on the image display device can be improved to a symmetric state by performing a conversion such that the light fluxes hit desired positions within the angle θ satisfying Eq. (1). Obviously, a similar relation holds between the optical axis 22 of the blue light fluxes and the angle made by the optical axis 61 of the lens array 8.

Figure 7:
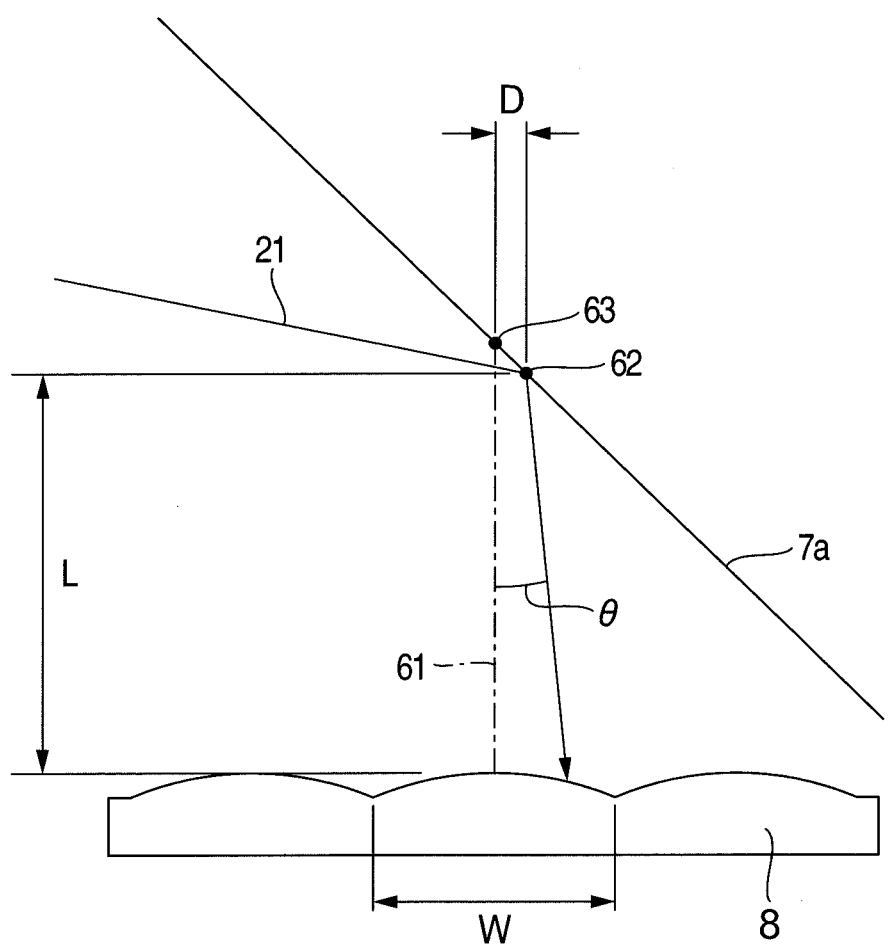
FIG. 7 is a ray diagram showing another relationship among the optical axes of light fluxes and the optical axis of a lens array in accordance with the invention.

FIG. 7 is a ray diagram showing the geometric relation between the optical axis 21 of the light fluxes and the optical axis 61 of the lens array 8 under the conditions where the point of reflection 62 of the optical axis 21 of the red light fluxes at the mirror surface 7a is not coincident with the intersection 63 of the optical axis 61 of the lens array 8 and the mirror surface 7a as shown in FIG. 6.

As shown in FIG. 7, let θ be the angle made between the optical axis 21 of the red light fluxes reflected at the mirror surface 7a and the optical axis 61 of the lens array 8. Let L be the length of the vertical line extending from the point of reflection 62 of the optical axis 21 of the red light fluxes at the mirror surface 7a to the lens array 8. Let W be the length of one side of each lens cell of the lens array. Let D be the length of the vertical line extending from the point of reflection 62 of the optical axis 21 of the red light fluxes at the mirror surface 7a to the optical axis 61 of the lens array 8.

Under this geometric condition, the following relation is satisfied:

$$\tan \theta < (W/2 - D)/L \qquad (2)$$

Under this condition, the absolute value of the length D of the vertical line is smaller than W/2. It can be seen from Eq. (2) that the optical axis of the light fluxes from the light source hits the lens cell at the center of the lens array at a given angle.

Even where light fluxes show a nonsymmetric distribution of light intensity, the illuminance distribution on the image display device can be improved to a symmetric state by performing a conversion such that the light fluxes hit desired positions within the angle θ satisfying Eq. (2). Obviously, a similar relation holds for the angle made between the optical axis 22 of the blue light fluxes and the optical axis 61 of the lens array 8.

If the size of the light source unit of a projector is reduced, the diameter of the incident light fluxes decreases. Therefore, the size of each lens cell of the lens array increases in a relative manner. Hence, the number of the lens cells decreases. This reduces the number of lens cells contributing to integrated imaging. Therefore, if the distribution of light intensity is asymmetric, the asymmetry of the illuminance distribution on the image display device becomes more conspicuous. Where the number of lens cells of the lens array lying in a given direction and responsive to incident light fluxes is small (e.g., five or less), if light fluxes having a nonsymmetric distribution are made to enter the lens array while being offset a given amount with respect to the optical axis of the lens array as in the present invention, the illuminance distribution is made uniform more effectively.

Where the magnifications of the lens array 8 and image display device 12 are set to small values in order to shorten the optical path length, the size of each lens cell of the lens array 8 increases. In the present configuration, the nonsymmetrical light fluxes are made to enter the lens array while their optical axes are offset a given amount with respect to the optical axis of the lens array. This configuration is more effective in making the illuminance distribution uniform.

Where the radius of curvature of each lens cell is set to a small value (e.g., 1 mm or less), the performance of the lens array tends to deteriorate. For instance, the transmissivity at the boundaries of the lens cell worsens. Therefore, where the lens cells are reduced using radii of curvature of 1 mm or more, it is necessary to reduce the magnifications. This in turn increases the size of each lens cell. In this case, the present configuration in which nonsymmetric light fluxes are made to enter the lens array while being offset a given amount with respect to the optical axis of the lens array is more effective in making uniform the illuminance distribution.

In the light source unit 4 equipped with the LED light sources 1 and 2 and used for a small-sized projector, it is desired that the distance between the optical axes of the light fluxes within the light source unit be 1.5 mm or less, for example. In this case, the small-sized wedge-shaped dichroic mirror 7 can be fabricated without increasing the spacing between the mirror surfaces 7a and 7b of the dichroic mirror 7.

In order to reduce the given amount of offset with respect to the optical axis of the lens array 8 or to make the red and blue light fluxes symmetric, the optical axis of the capture lens 5 is preferably aligned at the center between the optical axis of the LED light source 1 and the optical axis of the LED light source 2 or at the vicinity of the center between the two light sources 1 and 2.

Because of manufacturing restrictions on the wedge-shaped dichroic mirror 7, the angles of the mirror surfaces 7a and 7b are preferably so determined that the shorter one of the sides between the mirror surfaces 7a and 7b is 0.3 mm or more in length.

Since the distribution of light intensity of the green light fluxes passed through the capture lens 6 is symmetric, it is desired to adjustively rotate the green light source 3 and the capture lens 6 through a given angle such that the optical axis of the light fluxes passed through the wedge-shaped dichroic mirror 7 is coincident with the optical axis of the lens array 8.

Where the optical axes of light fluxes of plural colors are brought into coincidence, if there are light fluxes having a nonsymmetric distribution, there is the problem that the illuminance distribution of the image on the image display device obtained by superimposing the light fluxes by the lens array is nonsymmetric. However, where each lens cell of the lens array is sufficiently small compared with the light fluxes incident on the lens array, the asymmetry of the illuminance distribution on the image display device is no longer conspicuous. Therefore, where the lens cell is sufficiently small, the optical axes of the light fluxes may be brought into coincidence.

In the present invention, each of the LED light sources 1 and 2 equipped in the light source unit 4 is made of a single chip. The number of chips of the light source of each color is not restricted to one. Two or more chips may be used. For example, when the light source unit is made of four chips consisting of 2 chips for one color and 2 chips for another color, if the different LED light sources are alternately arranged in a rectangular geometry, the optical axes of the light sources of the colors are substantially coincident with the optical axis of the capture lens. Generally, where a plurality of different LED light source chips of two colors are arranged, if the arrangement forms point symmetry, it is desired to bring the optical axes of the light fluxes into coincidence. If line symmetry or symmetry is not achieved, it is desired that the optical axes of the light fluxes be not coincident.

However, the brightness distribution of the light from each LED light source of one color has a different peak. Therefore, it is desired that the LED light sources be arranged to make symmetric the optical axes of the LED light sources with respect to the optical axis of the capture lens and that the spacing between the LED light sources and the shape of the wedge-shaped dichroic mirror 7 be selected to make symmetric the optical axes of the LED light sources with respect to the optical axis of the lens array, as in the present embodiment.

An image display apparatus obtained by combining a power source, electric circuitry, and signal processing means with the optical engine 100 of the present embodiment can be made of a simple structure but can achieve both miniaturization and illuminance uniformity on a screen.

The above embodiment is now described more conceptually. The light source unit of the present invention has: at least a light source unit in which a light source emitting a first wavelength or wavelength range of light and a second light source emitting a second wavelength or wavelength range of light are juxtapositionally arranged; a third light source emitting a third wavelength or wavelength range of light; an optical combiner device for combining the three wavelengths or wavelength ranges of light from the light sources; and an optical device for averaging distributions of the wavelengths or wavelength ranges of light. At least two of the optical axes of the first wavelength or wavelength range of light, the second wavelength or wavelength range of light, and the third wavelength or wavelength range of light which enter the optical device are made noncoincident with each other.

Embodiment 2

Figure 8:
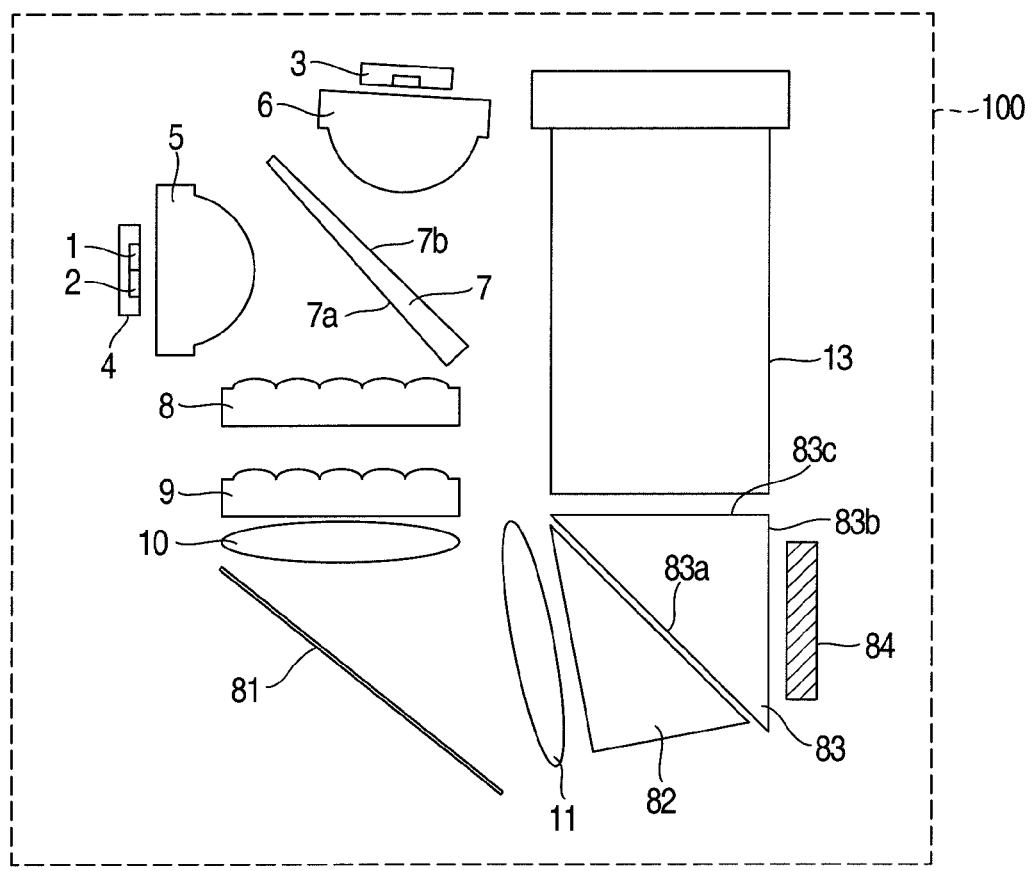
FIG. 8 is a schematic representation of one configuration of a light source unit according to Embodiment 2 of the present invention.

An example of configuration of a projection display system according to the present invention is next described by referring to FIG. 8. This system uses a DMD it (digital micromirror device) that is a micromirror type image display device.

An optical engine 100 has LED light sources 1, 2, and 3 each of which emits light fluxes of a given wavelength or wavelength range. In the present embodiment, it is assumed, for example, that the LED light source 1 emits red light fluxes having a center wavelength of about 615 nm, the LED light source 2 emits blue light fluxes having a center wavelength of about 460 nm, and the LED light source 3 emits green light fluxes having a center wavelength of about 525 nm. The wavelengths are restricted to these values. Furthermore, each color of light fluxes may have a given wavelength range. It is also assumed that the light fluxes emitted from each LED light source are strongest at the center of the light fluxes and have a symmetric distribution of light intensity. The center of the light fluxes at which the light intensity is strongest is taken as the optical axis of the light fluxes.

The LED light sources 1 and 2 are juxtapositionally mounted in the light source unit 4. Since the light sources are close to each other and juxtaposed, a small-sized light source unit can be accomplished.

The red light fluxes emitted from the LED light source 1 and the blue light fluxes emitted from the LED light source 2 are substantially collimated by a capture lens 5. The green light fluxes emitted from the LED light source 3 are substantially collimated by a capture lens 6. Each of the capture lenses 5 and 6 is an isotropic spherical or nonspherical lens made of glass or plastic. In FIG. 8, each of the capture lenses 5 and 6 is shown to consist of a single lens. In order to obtain desired collimated light fluxes, two or more lenses may be provided as each of the capture lenses 4 and 5.

A wedge-shaped dichroic mirror 7 is an optical combiner device for combining the red, blue, and green light fluxes passed through the capture lenses 5 and 6. The dichroic mirror 7 has a mirror surface 7a located closer to the capture lens 5 and a mirror surface 7b located closer to the capture lens 6. The mirror surface 7a is a wavelength-selective mirror surface having a function of reflecting the red light fluxes and transmitting the blue and green light fluxes. The mirror surface 7b is a wavelength-selective mirror surface having a function of reflecting the blue light fluxes and transmitting the red and green light fluxes. The light fluxes of the three colors are combined by these functions.

The angle of the mirror surface 7a is so set that the optical axis of the red light fluxes is incident on the lens array 8 while is substantially parallel to the optical axis of the lens array 8 or at a given angle to the optical axis of the lens array 8 and offset a given amount from the optical axis of the lens array 8. Similarly, the angle of the mirror surface 7b is so set that the optical axis of the blue light fluxes is incident on the lens array 8 while is substantially parallel to the optical axis of the lens array 8 or at a given angle to the optical axis of the lens array 8 and offset a given amount from the optical axis of the lens array 8. The angles of the LED light source 3 and capture lens 6 are so set that the optical axis of the green light fluxes incident on the lens array 8 is substantially coincident with the optical axis of the lens array 8.

Where distributions of light intensity of light fluxes are nonsymmetric, the illuminance distribution on the screen can be made uniform by entering the three colors of light fluxes into the lens array while their optical axes are made noncoincident through the use of the wedge-shaped dichroic mirror 7.

The light fluxes incident on the first lens array 8 then enter the second lens array 9, thus forming virtual light source images by the lens cells of the lens array 9. In FIG. 8, one side of each lens array is shown to be composed of five lens cells. Obviously, the number of lens cells is not restricted to five.

The light fluxes passed through the lens array 9 pass through a relay lens 10 and then are reflected at a given angle by a mirror 81. Then, the light fluxes pass through a relay lens 11, a triangular prism 82, a totally reflective surface 83a and a prism surface 83b of a TIR (total internal reflection) prism 83, and enter a DMD (digital micromirror device) 84 at a given angle. The relay lens 10 has a function of superimposing optical source images from the lens cells of the lens array 9. Since the mirror 81 can bend the optical path, the optical engine 100 can be reduced in size while maintaining the optical path length. The relay lens 11 has a function of converting the superimposed light fluxes into light fluxes substantially parallel to the image display device (DMD) 84 and making the obtained light fluxes impinge on the image display device 84. The triangular prism 82 has a function of correcting the optical path difference caused by the TIR prism 83 located immediately behind the prism 82. The TIR prism 83 has a function of propagating the light fluxes entering from the triangular prism 82 to the DMD 84. The light fluxes reflected by the DMD 84 are totally reflected by the totally reflective surface 83a and propagated to the projector lens 13. An air gap of a given spacing is formed between the triangular prism 82 and the TIR prism 83.

An image of high uniformity can be created in this way on the DMD 84 by the illuminating optical system beginning with the lens array 8 and ending with the TIR prism 83. In FIG. 8, two relay lenses are used. Any desired number of relay lenses may be used as long as a desired image can be obtained with the DMD 84.

The principal axis of the light fluxes reflected by the DMD 84 is incident on the prism surface 83b substantially perpendicularly to it. Then, the light fluxes are totally reflected by the totally reflective surface 83a and pass through the prism surface 83c. As described previously, the air gap is formed between the totally reflective surface 83a of the TIR prism 83 and the triangular prism 82. The index of refraction of the TIR prism 83 is so set that the incident angle of the reflected light fluxes is greater than the critical angle of incidence for total reflection by making use of the air gap.

The reflected light fluxes passed through the prism surface 83c are projected through the projector lens 13 onto a screen (not shown), thus displaying a magnified image. As described so far, a small-sized light source unit producing a uniform illuminance distribution can be accomplished by using the mirror 81, the triangular prism 82, and the TIR prism 83 in the illuminating optical system and also by using the DMD 84 that is an image display device which needs light fluxes to enter the device at a given angle.

Figure 9:
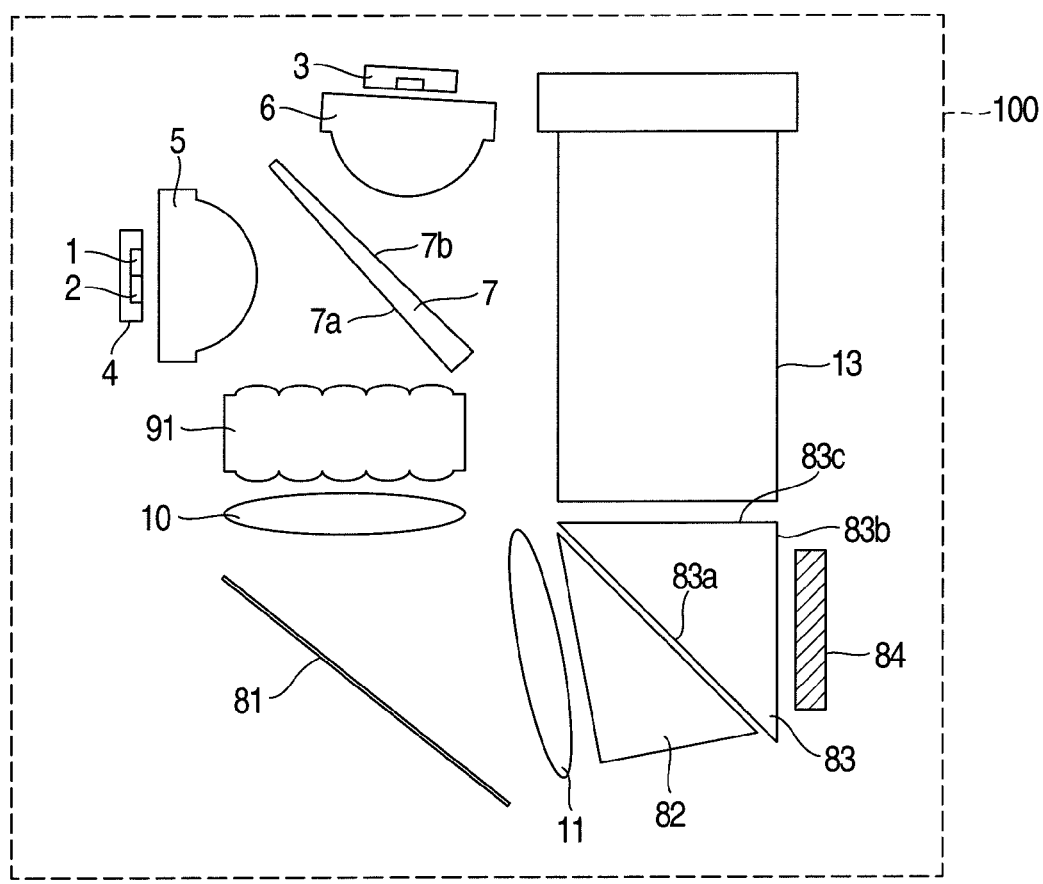
FIG. 9 is a schematic representation of another configuration of the light source unit according to Embodiment 2 of the invention.

FIG. 9 shows another example of the optical engine 100 of the projection display system using the DMD 84. This optical engine 100 is similar to the optical engine shown in FIG. 8 except that a both-sided lens array 91 is disposed in the positions of the two lens arrays instead of these lens arrays.

As shown, the both-sided lens array 91 has lens arrays on its incident and exit surfaces. This both-sided lens array 91 alone has the same function as two lens arrays and so the number of components can be reduced. Also, the mounting time can be shortened. Where two lens arrays are used, if they are misaligned during mounting, the transmittance or illuminance distribution will be affected. Where a single both-sided lens array is mounted in this embodiment, the effects can be reduced.

Figure 10:
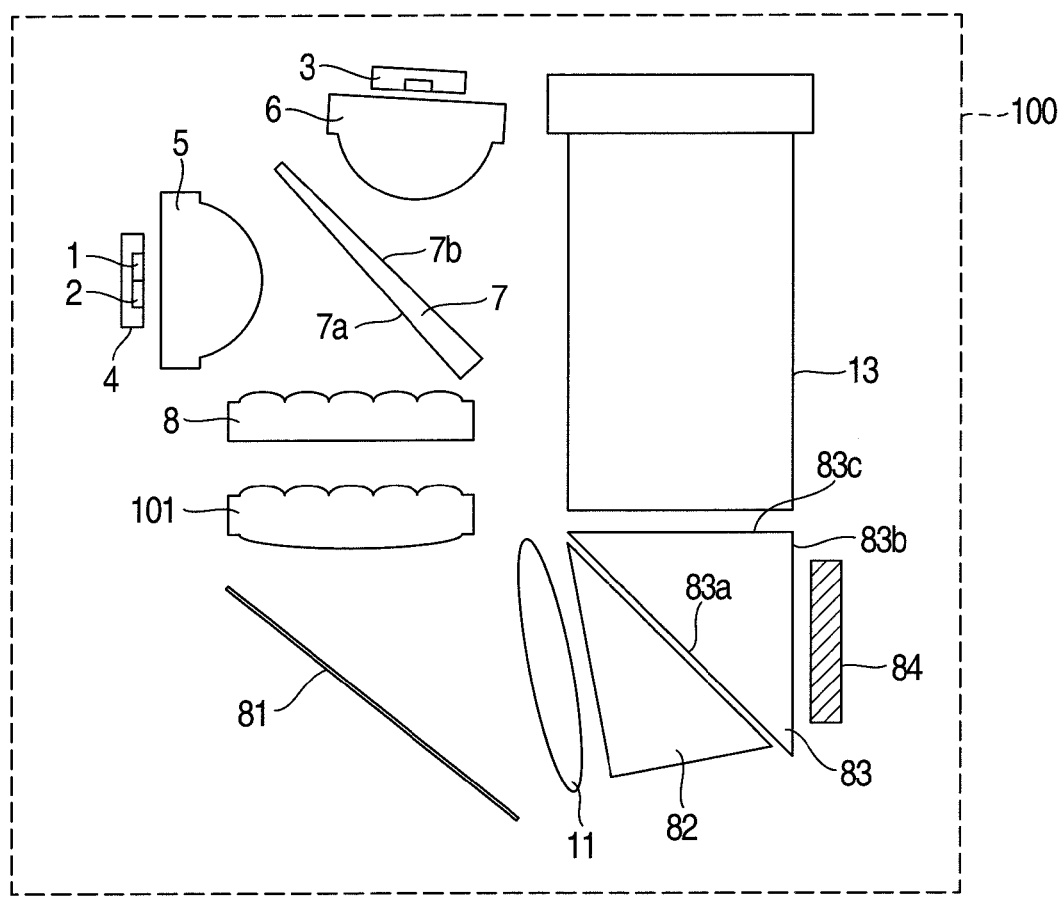
FIG. 10 is a schematic representation of a further configuration of the light source unit according to Embodiment 2 of the invention.

FIG. 10 shows another example of the optical engine 100 for the projection display system using the DMD 84. This optical engine 100 is similar to the optical engine 100 shown in FIG. 8 except that the lens array 9 and the relay lens 10 have been combined into a composite lens 101.

As shown, the composite lens 101 has a lens array on its incident surface and a lens surface on its exit surface. Since a relay lens placed immediately after a lens array has a large radius of curvature, only one lens surface suffices to have a function of superimposing light source images. The single composite lens has the same functions as the functions of a lens array and of a relay lens and so the number of components can be reduced. The mounting time can be shortened. Furthermore, the distance from the lens array to the relay lens can be reduced. Consequently, the light source unit can be reduced in size.

Figure 11:
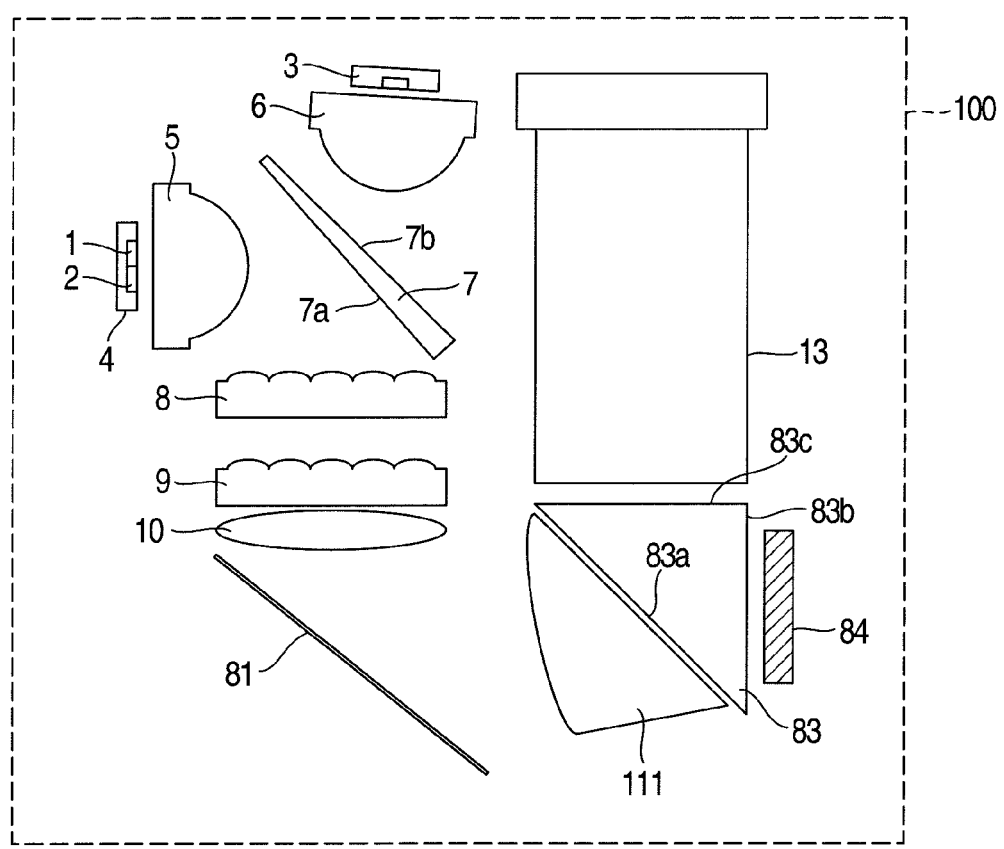
FIG. 11 is a schematic representation of an additional configuration of the light source unit according to Embodiment 2 of the invention.

FIG. 11 shows a further example of the optical engine 100 for the projection display system using the DMD 84. This optical engine 100 is similar to the optical engine 100 shown in FIG. 8 except that there is mounted a composite prism 111 in which the relay lens 10 and the triangular prism 82 have been combined.

As shown, the composite prism 111 is a device having the triangular prism 82 having the incident surface on which a lens surface having the function of a relay lens is formed. Since the single composite prism has the same functions as two lens arrays, the number of components can be reduced. Hence, the mounting time can be shortened. Furthermore, the distance from the relay lens to the triangular prism can be shortened and so the light source unit can be reduced in size.

Figure 12:
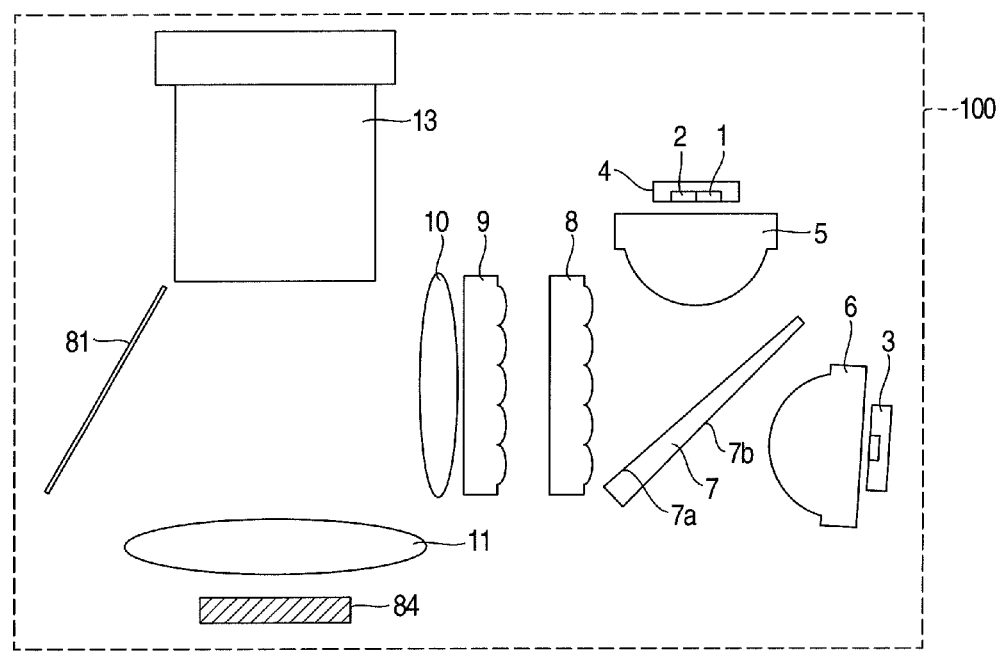
FIG. 12 is a schematic representation of a yet other configuration of the light source unit according to Embodiment 2 of the invention.

FIG. 12 shows a still other example of the optical engine 100 for the projection display system using the DMD 84. Unlike the optical engines shown in FIGS. 8-11, none of the triangular prism 82 and TIR prism 83 are used. The mirror 81 is placed in a position on which the light fluxes reflected from the DMD 84 are not incident. The mirror 81 is shown to consist of a planar mirror. In order to correct aberrations due to optical path difference, the mirror 81 may also be a spherically shaped mirror such as a spherical mirror, a nonspherical mirror, or a free-form curved mirror. Since the number of components is reduced by two, the mounting time and cost can be reduced. In addition, the optical engine 100 can be reduced in size by compactly designing the projector lens 13.

Obviously, the optical engine 100 using the DMD 84 is not restricted to the configurations shown in FIGS. 8-12.

An image display apparatus obtained by combining a power source, electric circuitry, and signal processing means with the optical engine 100 of the present embodiment can be made of a simple structure but can achieve both miniaturization and illuminance uniformity on a screen.

Embodiment 3

Figure 13:
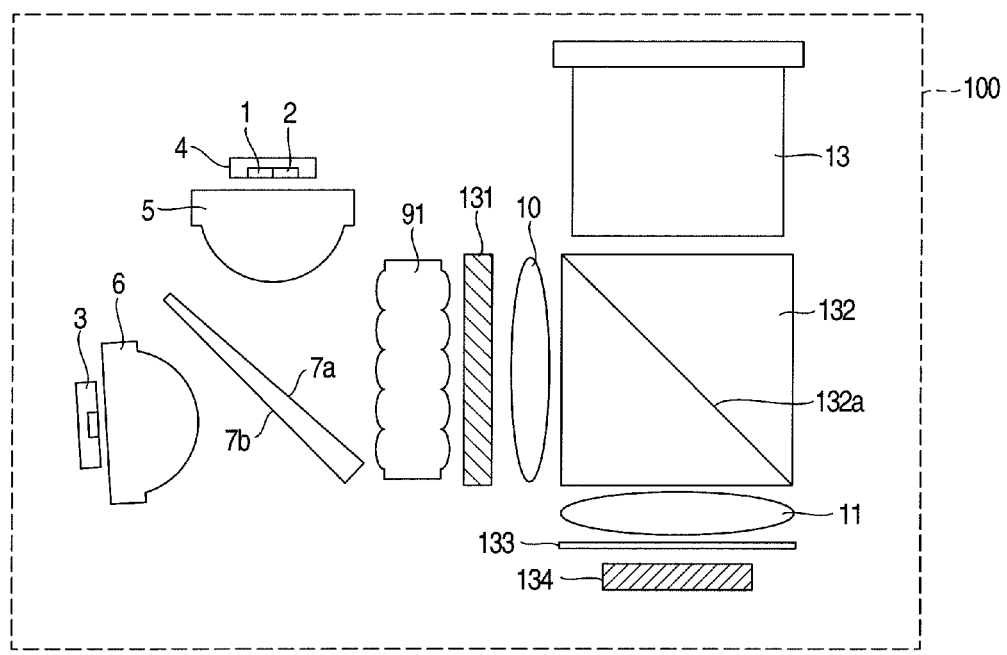
FIG. 13 is a schematic representation of one configuration of a light source unit according to Embodiment 3 of the present invention.

FIG. 13 shows one example of configuration of the image display apparatus according to the present invention, the apparatus using an LCOS that is a reflective liquid crystal display as an image display device.

FIG. 13 shows one example of optical engine 100 for a projection display system according to embodiment 2 of the present invention. The optical engine 100 has LED light sources 1, 2, and 3 each of which emits a given wavelength or wavelength range of light fluxes. In the present embodiment, it is assumed, for example, that the LED light source 1 emits red tight fluxes having a center wavelength of about 615 nm, the LED light source 2 emits blue light fluxes having a center wavelength of about 460 nm, and the LED light source 3 emits green light fluxes having a center wavelength of about 525 nm. The wavelengths are not restricted to the above values. Furthermore, each color of light fluxes may have a given wavelength range. It is also assumed that the light fluxes emitted from each LED light source are strongest at the center of the light fluxes and have a symmetric distribution of light intensity. The center of the light fluxes at which the light intensity is strongest is taken as the optical axis of the light fluxes.

The LED light sources 1 and 2 are juxtapositionally mounted in the light source unit 4. Since the light sources are close to each other and juxtaposed, miniaturization of the light source unit can be accomplished.

The red light fluxes emitted from the LED light source 1 and the blue light fluxes emitted from the LED light source 2 are substantially collimated by a capture lens 5. The green light fluxes emitted from the LED light source 3 are substantially collimated by a capture lens 6. Each of the capture lenses 5 and 6 is assumed to be an isotropic spherical or nonspherical lens made of glass or plastic. In FIG. 13, each of the capture lenses 5 and 6 is shown to consist of a single lens. In order to obtain desired collimated light fluxes, two or more lenses may be provided as each of the capture lenses 5 and 6.

A wedge-shaped dichroic mirror 7 is an optical combiner device for combining the red, blue, and green light fluxes passed through the capture lenses 5 and 6. The dichroic mirror 7 has a mirror surface 7a located closer to the capture lens 5 and a mirror surface 7b located closer to the capture lens 6. The mirror surface 7a is a wavelength-selective mirror surface having a function of reflecting the red light fluxes and transmitting the blue and green light fluxes. The mirror surface 7b is a wavelength-selective mirror surface having a function of reflecting the blue light fluxes and transmitting the red and green light fluxes. The light fluxes of the three colors are combined by these functions and made to enter a both-sided lens array 91.

The angle of the mirror surface 7a is so set that the optical axis of the red light fluxes is incident on the lens array 91 while is substantially parallel to the optical axis of the lens array 91 or at a given angle to the optical axis of the lens array 8 and offset a given amount from the optical axis of the lens array 8. Similarly, the angle of the mirror surface 7b is so set that the optical axis of the blue light fluxes is incident on the lens array 8 while is substantially parallel to the optical axis of the lens array 8 or at a given angle to the optical axis of the lens array 8 and offset a given amount from the optical axis of the lens array 8. The angles of the LED light source 3 and capture lens 6 are so set that the optical axis of the green light fluxes incident on the lens array 91 is substantially coincident with the optical axis of the lens array 8.

Where distributions of light intensity of light fluxes are nonsymmetric, the illuminance distribution on the screen can be made uniform by entering the three colors of light fluxes into the lens array while their optical axes are made noncoincident by the use of the wedge-shaped dichroic mirror 7.

The light fluxes incident on the both-sided lens array 91 form images of virtual light sources whose number is equal to the lens cells formed on the lens array on the exit surface. In FIG. 13, one side of the lens array is shown to be composed of five lens cells. Obviously, the number of lens cells is not restricted to five. Additionally, two one-sided lens arrays may be used instead of the both-sided lens array 91.

Light fluxes passed through the both-sided lens array 91 enter a polarization converter device 131, which converts randomly polarized light into desirably polarized light. In the present configuration, randomly polarized light fluxes emitted from each LED light source is converted so as to be collected onto the polarizing films of the polarization converter device 131 by the both-sided lens array 91. After the light is separated into p-polarized light and s-polarized light at each polarizing film, the p-polarized light is converted into s-polarized light by a half-wave plate mounted at the p-polarized light exit portion. Thus, randomly polarized light is converted into s-polarized light. Consequently, loss of light amount due to a polarized beam splitter 132 can be prevented, and an optical system of high efficiency can be accomplished.

The light fluxes passed through the polarization converter device 131 pass through the relay lens 10 and are reflected by the polarizing film 132a of the polarized beam splitter 132. The polarized beam splitter 132 is an optical branching device having a function of transmitting light polarized in a given direction and reflecting light polarized in the direction perpendicular to the given direction. In the present configuration, it is assumed that the polarized beam splitter 132 has a function of reflecting s-polarized light and transmitting p-polarized light.

The light fluxes passed through the polarized beam splitter 132 pass through the relay lens 11 and then are converted into circularly polarized light by a quarter-wave plate 133. The light fluxes then enter an LCOS 134 that is a reflective liquid crystal display. In this way, an image of uniform illuminance can be formed at high efficiency on the LCOS 134 by the optical system beginning with the both-sided lens array 91 and ending with the quarter-wave plate 133. In FIG. 13, two relay lenses are provided. Any desired number of relay lenses may be used as long as a desired image can be obtained by the LCOS 134. Furthermore, in order to improve the efficiency of transmission of light fluxes, phase compensator plates may be mounted, for example, between the relay lens 10 and the polarized beam splitter 132 and between the relay lens 10 and the quarter-wave plate 133.

The light fluxes reflected by the LCOS 134 are again converted into p-polarized light by the quarter-wave plate 133 and pass through the polarizing film 132a of the polarized beam splitter 132. The reflected light fluxes passed through the polarized beam splitter 132 are projected onto a screen (not shown) through the projector lens 13 to form a magnified image. As described so far, the optical engine 100 providing a uniform illuminance distribution can be accomplished using the LCOS 134 that is a reflective liquid crystal display. Furthermore, the optical engine 100 can be reduced in size by compactly designing the projector lens 13.

Figure 14:
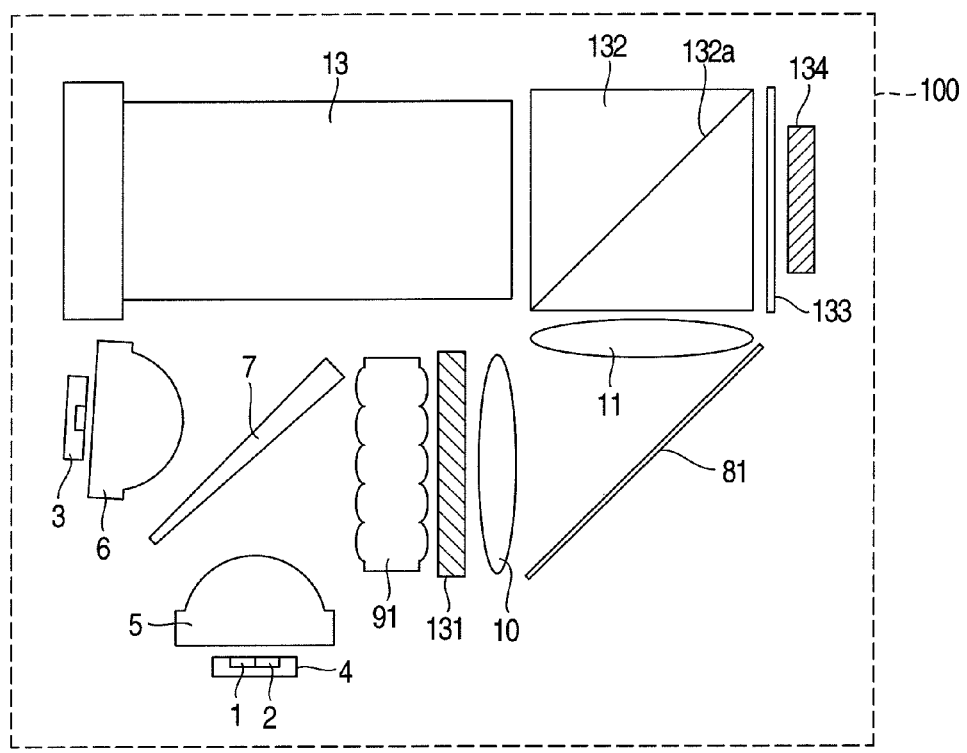
FIG. 14 is a schematic representation of another configuration of the light source unit according to Embodiment 3 of the invention.

FIG. 14 shows a still other example of the optical engine 100 of the projection display system using the LCOS 134. This optical engine 100 is similar to the optical engine 100 shown in FIG. 13 except that the relay lens 11 is mounted ahead of the polarized beam splitter 132 and that a mirror 81 is mounted between the relay lenses 10 and 11.

The relay tens 11 is mounted ahead of the polarized beam splitter 132. Therefore, this splitter acts on only light fluxes incident on the LCOS 134. Consequently, the shape of the optical engine can be made simpler. The mirror 81 is mounted and the optical path is bent. Thus, the whole optical engine 100 can be made small in size.

Obviously, the optical engine 100 using the LCOS 134 is not restricted to the configurations of FIGS. 13 and 14.

An image display apparatus obtained by combining a power source, electric circuitry, and signal processing means with the optical engine 100 of the present embodiment can be made of a simple structure but can achieve both miniaturization and illuminance uniformity on a screen.

It is to be understood that the present invention is not restricted to the above embodiments but rather embraces various modifications of the embodiments. For example, the above embodiments have been described in detail for ease of understanding of the present invention. The invention is not always restricted to those having all the configurations described. Furthermore, some configurations of some embodiment may be replaced by configurations of other embodiment. In addition, configurations of other embodiment may be added to configurations of some embodiment.

The above-described embodiments are light source units for use with or in projection display systems for projecting a two-dimensional image. The embodiments are techniques that can also be applied to apparatus using light emitted from light sources for projecting a two-dimensional image, such as an illumination unit of an optical microscope. Especially, the embodiments are beneficially applied to an illumination unit using a lens array that makes uniform the illuminance using point light sources emitting diffused light.

It should be further understood by those skilled in the art that although the foregoing description has been made on embodiment of this invention, the invention is not limited thereto and various changes and modifications may be made without departing from the spirit of the invention and scope of the appended claims.

The invention claimed is:

1. A light source unit for use with or in a projection display system that projects an image onto a plane, said light source unit comprising:
   a first solid-state light source emitting two-dimensional light fluxes of a first color to be projected;
   a second solid-state light source emitting two-dimensional light fluxes of a second color to be projected;
   a third solid-state light source emitting two-dimensional light fluxes of a third color to be projected;
   a wedge-shaped dichroic mirror having a first dichroic surface and a second dichroic surface which are located opposite to each other in a non-parallel relationship to each other, the first dichroic surface reflecting the light fluxes from the first solid-state light source, the second dichroic surface reflecting the light fluxes from the second solid-state light source, the light fluxes from the third solid-state light source being transmitted through the first and second dichroic surfaces; and
   a lens array for smoothing an illuminance distribution of light fluxes incident from the wedge-shaped dichroic mirror;
   wherein the light fluxes from the third solid-state light source define an optical axis that is bent by the wedge-shaped dichroic mirror so as to be coincident with an optical axis of the lens array and incident on the lens array;
   wherein the light fluxes from the first solid-state light source and the light fluxes from the second solid-state light source are reflected symmetrically about the optical axis of the lens array by the wedge-shaped dichroic mirror and enter the lens array;
   wherein the light fluxes from said first solid-state light source and the light fluxes from said second solid-state light source enter said lens array symmetrically about the optical axis of the lens array and at given angles to the optical axis of the lens array;
   wherein the optical axis of the light fluxes from said first solid-state light source and the optical axis of the light fluxes from said second solid-state light source pass through a position spaced from an intersection of the optical axis of said lens array and said first dichroic surface by a given amount and are symmetrically incident on the lens array at a given angle to the optical axis of the lens array; and wherein a relation given by $$\tan \theta < (W/2 - D)/L$$

is satisfied, where D is the distance between the position on said first dichroic surface through which the optical axis of the light fluxes from said first solid-state light source or from said second solid-state light source passes and the optical axis of said lens array, L is the vertical distance between the intersection and the lens array, W is the length of one side of one lens surface of the lens array, and $\theta$ is the angle made between the optical axis of the light fluxes which is incident on the lens array after being emitted from the first solid-state light source or from the second solid-state light source and the optical axis of the lens array.

2. A light source unit comprising:

a first light source subassembly in which a first solid-state light source producing light of a first color and a second solid-state light source producing light of a second color are disposed;

a second light source subassembly having a third solid-state light source producing light of a third color;

a first collimator lens for converting the light exiting from the first light source subassembly into substantially collimated light;

a second collimator lens for converting the light exiting from the second light source subassembly into substantially collimated light;

a wedge-shaped dichroic mirror for combining light fluxes exiting from the first collimator lens and light fluxes exiting from the second collimator lens; and a lens array for smoothing an illuminance distribution of the output light fluxes from the wedge-shaped dichroic mirror;

wherein the light fluxes of the first color and the light fluxes of the second color exiting from the first collimator lens are reflected by the wedge-shaped dichroic mirror symmetrically about the optical axis of the lens array and enter the lens array;

wherein said wedge-shaped dichroic mirror has a first dichroic surface and a second dichroic surface which are opposite to each other in a non-parallel relation to each other, wherein the first dichroic surface reflects the light of said first color and the second dichroic surface reflects the light of said second color, wherein the light of said third color passes through the first and second dichroic surfaces;

wherein the optical axis of the light of the third color exiting from said second light source subassembly is coincident with the optical axis of said second collimator lens;

wherein the optical axis of the light of the third color exiting from the second collimator lens is bent so as to agree with the optical axis of the lens array by said wedge-shaped dichroic mirror and enters the lens array;

wherein said first and second solid-state light sources are disposed off the optical axis of the first collimator lens;

wherein the optical axis of the substantially collimated light fluxes from the first solid-state light source and the optical axis of the substantially collimated light fluxes from the second solid-state light source are different in direction from the optical axis of the first collimator lens;

wherein the optical axis of the light fluxes of said first color and the optical axis of light fluxes of said second color pass through positions spaced from the intersection of the optical axis of said lens array and said first dichroic surface by a given distance and enter the lens array symmetrically about the optical axis of the lens array at a given angle to the optical axis of the lens array; and wherein a relation given by $$\tan \theta < (W/2 - D)/L$$

is satisfied, where D is the distance between the position on said first dichroic surface through which the optical axis of the light fluxes of said first or second color passes and the optical axis of said lens array, L is the vertical distance between the intersection and the lens array, W is the length of one side of one lens surface of the lens array, and $\theta$ is the angle made between the optical axis of the light fluxes of the first or second color which enter the lens array and the optical axis of the lens array.

* * * * *